United States Patent
Rajagopal et al.

(10) Patent No.: US 7,110,540 B2
(45) Date of Patent: Sep. 19, 2006

(54) MULTI-PASS HIERARCHICAL PATTERN MATCHING

(75) Inventors: Priya Rajagopal, Hillsboro, OR (US); David M. Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 10/134,066

(22) Filed: Apr. 25, 2002

(65) Prior Publication Data

US 2003/0204703 A1 Oct. 30, 2003

(51) Int. Cl.
*H04L 9/00* (2006.01)
(52) U.S. Cl. .................... 380/44; 380/28; 380/262; 380/281; 713/181; 707/3; 707/6; 707/101
(58) Field of Classification Search .............. 380/28, 380/262, 281, 44; 713/181; 707/101, 3, 707/6
See application file for complete search history.

(56) References Cited

U.S. PATENT DOCUMENTS

| 6,108,666 | A | * | 8/2000 | Floratos et al. | .......... 707/104.1 |
| 6,240,409 | B1 | * | 5/2001 | Aiken | ............................. 707/4 |
| 6,738,779 | B1 | * | 5/2004 | Shapira | ...................... 707/101 |
| 6,785,672 | B1 | * | 8/2004 | Floratos et al. | ................. 707/3 |

* cited by examiner

*Primary Examiner*—Emmanuel L. Moise
*Assistant Examiner*—Paul Callahan
(74) *Attorney, Agent, or Firm*—Fish & Richardson P.C.

(57) ABSTRACT

A hash table randomly populated with byte patterns is used in finding the byte patterns in a sequence of bytes. A hash function is applied to information associated with a substring of the sequence of bytes to generate a key value. The key value is compared to the keys of the hash table, and if a match is found, the information associated with the substring is compared to corresponding information associated with a substring of a byte pattern stored in the hash table. If a match is found, the substring of the sequence of bytes is compared to the substring of the byte pattern. If a match is found, the substring is compared to the byte pattern.

46 Claims, 4 Drawing Sheets

| Pattern 1: | dcaaa —— 103 |
| Pattern 2: | aa |
| Pattern 3: | caac —— 102 |
| Pattern 4: | baab |
| Pattern 5: | dcad —— 105 |
| Pattern 6: | caaab |

MULTI-PASS HIERARCHICAL PATTERN MATCHING

BACKGROUND

Pattern matching is useful in inspecting and classifying packets sent over a network. For example, a network firewall or an intrusion detection system may inspect packets for computer virus patterns and appropriately filter such packets. A server load balancer may compare text within the packets to a list of Universal Resource Locator (URL) addresses, then classify and redirect the packets to specific servers based on the URLs. Such classification of packets requires comparison of the packets with a set of predefined patterns (e.g., computer virus patterns or URLs).

One method of inspecting the packets is the "brute force" approach, which compares the packets with an entire set of predefined patterns. This method is easy to implement, but requires a computation time that increases in proportion to the amount of incoming data and the number of patterns. This method is often used when only the header portions of the packets need to be inspected or when the transmission rate of the packets is low.

Another method of inspecting packets is to use a hash table to reduce the number of comparisons required. A hash table is constructed by applying a hash function to the predefined byte patterns to generate "keys," which are used as indices in the hash table. A key may correspond to several byte patterns. For example, if there are 1000 byte patterns to be compared, a hash function may map the 1000 byte patterns to 100 keys, each key corresponding to about 10 byte patterns. To compare a text string with the 1000 byte patterns, the hash function is applied to the text string to generate a key value. This key value is compared with the 100 keys in the hash table. If no match is found, then the text string will not match any of the 1000 byte patterns. If a match is found (i.e., the text string "hashes" into the hash table), then the text string is compared with the 10 or so byte patterns that correspond to the matching key to see if the text string matches any of the byte patterns. A condition in which two or more text strings hash to the same key value is called a "collision".

DESCRIPTION OF DRAWINGS

FIG. 1 shows a list of byte patterns.

DETAILED DESCRIPTION

By constructing a hash table that is "randomly populated" (meaning that the patterns are evenly distributed throughout the hash table), the number of collisions can be reduced, thereby reducing the number of byte pattern comparisons that is required when collisions occur. This reduces the processing time required for comparing a sequence of bytes with a set of predefined byte patterns stored in the hash table. The comparison process includes taking a string of bytes from the sequence of bytes, and comparing the string to a predefined byte pattern after tests are performed to increase the probability that the string will match the predefined byte pattern. The tests include determining whether the string corresponds to a key in the hash table, determining whether a checksum of a portion of the string matches one or more checksums of portions of predefined byte patterns that corresponds to the key, and determining whether a checksum of the string matches a checksum of a predefined byte pattern.

By comparing the string to the predefined byte patterns when the probability that a match will occur is high, the number of byte pattern comparisons is reduced, further reducing the processing time required for comparing the sequence of bytes with the set of predefined byte patterns.

Figure 2:
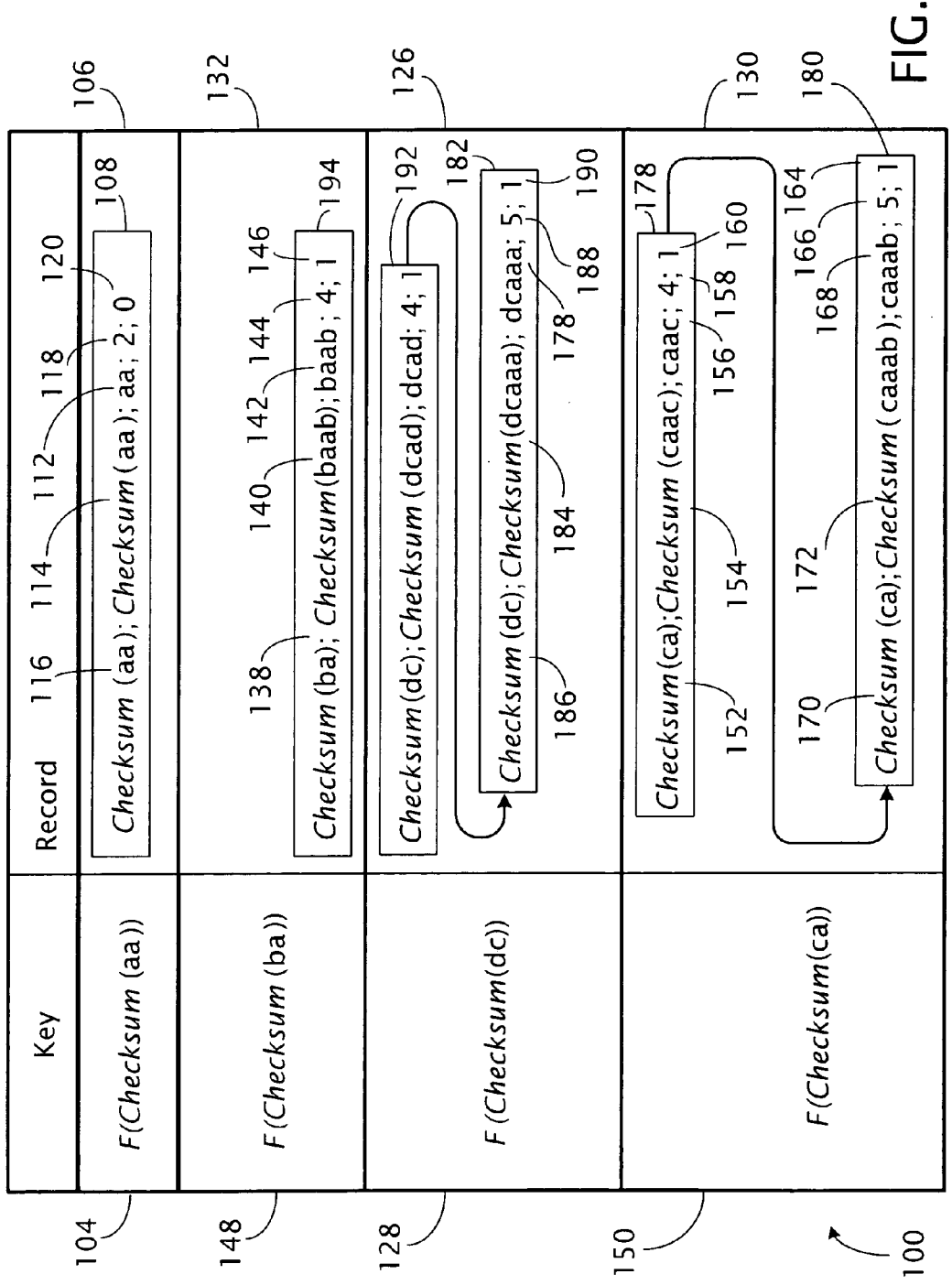
FIG. 2 shows a hash table.

Referring to FIGS. 1 and 2, a hash table 100 is constructed from a set of byte patterns 124. A byte pattern can be, for example, an English word, a number, a URL, a token word for a communications protocol, a pattern indicative of a virus, a pattern representing an image, a pattern representing a sound, or an arbitrary binary pattern. A portion of a byte pattern will be referred to as a "substring" of the byte pattern. A hash function F( ) is applied to a checksum of a substring of a byte pattern (e.g., 102) to generate a key (e.g., 104) that corresponds to a record (e.g., 106) in hash table 100. The substring has a length equal to the shortest byte pattern (e.g., "aa") among the entire set of patterns.

As the byte patterns are processed to establish records 106 of hash table 100, the substrings of remaining byte patterns are selected to be different from substrings already selected from previously processed byte patterns. For example, if "dc" has been selected as the substring of "dcaaa" 103, and "ca" has been selected as the substring of "caac" 102, then "ad" will be selected as the substring of "dcad" 105 to avoid collision. This allows the patterns to be more evenly distributed throughout the hash table, reducing the probability of several patterns hashing to the same key value, thereby reducing the number of collisions.

Each record in hash table 100 includes one or more items (e.g., 108) that correspond to a given key. Each item contains a byte pattern (e.g., 112), a checksum (e.g., 114) of the byte pattern, a checksum (e.g., 116) of a substring of the byte pattern, a length value (e.g., 118) representing the number of bytes in the byte pattern, and a mismatch value (e.g., 120) representing the position of the substring in the byte pattern. Matching keys is faster than matching checksums of substrings of the byte patterns, which is faster than matching checksums of the byte patterns, which in turn is faster than matching the byte patterns.

A checksum function is one that receives a byte string (string of bytes, e.g., "caac") as input and generates a numeric value that is characteristic of the byte string while also being smaller in size than the string. It is faster to compare the checksums of two byte strings than to compare the byte strings. Examples of checksum functions may be based on cyclic redundancy check (CRC) calculations or Message-Digest 5 (MD5) algorithm. When the checksums of two byte strings do not match, it is certain that the two byte strings do not match. When the checksums of substrings of two byte strings (e.g., the checksums of the first n bytes of two byte strings) do not match, it is also certain that the two byte strings do not match.

An example of a process for constructing hash table 100 will be described using the byte patterns 124 as an example, followed by a description of how a sequence of bytes may be compared with the byte patterns stored in the hash table.

Figure 3:
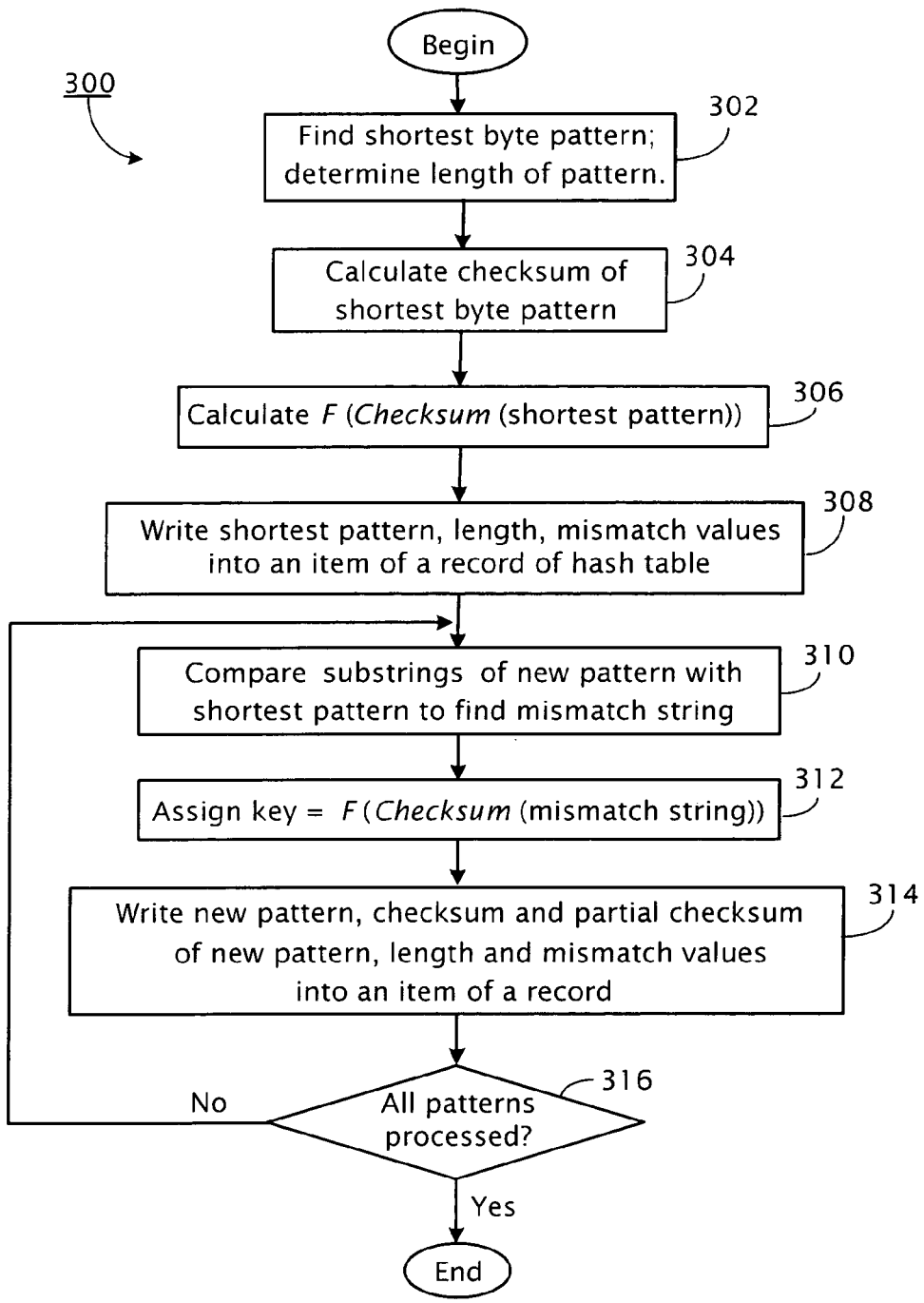
FIG. 3 shows a flowchart.

Referring to FIG. 3, a process 300 illustrates an example of how a computer (e.g., 200 in FIG. 4) may construct a hash table 100. Initially, a record 106 relating to the shortest byte pattern is established by the following process. The computer finds 302 the shortest byte pattern among the set of byte patterns (which is "aa" in this example), and determines the length of the shortest byte pattern (which is 2). The computer calculates 304 the checksum of the shortest byte pattern. The notation Checksum("aa") is used to represent the checksum of "aa". The computer applies 306 the hash function F( ) to the checksum of the shortest byte pattern, and designates F(Checksum("aa")) as a key 104 to record 106. An example of a hash function F( ) is a truncation function that truncates the higher bits and retains the lower bits of a binary number.

The computer then writes 308 byte pattern "aa" 112 into item 108 of record 106. The computer also writes a length value 118 into item 108. The length value represents the length of "aa", which is equal to 2. The computer writes a mismatch value 120 into item 108. The mismatch value represents the position of a substring that differs from the shortest byte pattern. Here, since the "aa" itself is the shortest byte pattern, the mismatch value is 0.

After writing the byte pattern, the checksums, the length and mismatch values, the contents of hash table 100 becomes:

| Key | Record |
|---|---|
| F(Checksum("aa")) | Checksum("aa"); Checksum("aa"); "aa"; 2; 0 |

Next, the computer constructs another record 126 from byte pattern "dcaaa" 103 according to the following process. The computer compares 310 substrings of length 2 in byte pattern "dcaaa" with the shortest byte pattern "aa" to find a "mismatch string." For example, the first substring from the left in "dcaaa" is "dc." Substring "dc" does not match "aa," so "dc" is called the mismatch string. Because the mismatch string occurs in position 1 of "dcaaa" (meaning the first character of the mismatch string is at position 1 of "dcaaa"), the mismatch value is 1. The computer computes F(Checksum("dc")), and assigns 312 F(Checksum("dc")) as a key 128 to record 126.

The computer writes 314 the byte pattern "dcaaa" 178 into an item 182 in record 126. The computer then writes a checksum 184 of byte pattern "dcaaa", a checksum 186 of mismatch string "dc", a length value 188, and a mismatch value 190 into item 182. After writing the new byte pattern, the checksums, the length and mismatch values, the contents of hash table become:

| Key | Record |
|---|---|
| F(Checksum("aa")) | Checksum("aa") ; Checksum("aa") "aa"; 2; 0 |
| F(Checksum("dc")) | Checksum("dc"); Checksum("dcaaa"); "dcaaa"; 5; 1 |

Next, the computer determines 316 whether all byte patterns 124 have been processed. If yes, construction of the hash table is completed. If not, the computer repeats comparing 310 substrings of patterns, assigning 312 F(Checksum(mismatch string)) as keys, and writing 314 information into records for every other byte pattern in the set of byte patterns 124 to complete construction of hash table 100.

During construction of the hash table 100, if the mismatch strings of the two byte patterns are the same, then the byte patterns will have the same keys and hash into the same record in the hash table. For example, byte strings "dcad" and "dcaad" both have the same mismatch string "dc", so both have the same key F(Checksum("dc")), and both hash into the same record 126. Thus, a separate item 192 is used to store information relating to "dcad."

The items 182 and 192 are constructed as a linked list, i.e., each item is linked to a subsequent item by a pointer. In general, an item relating to a shorter byte pattern (e.g. "dcad" is shorter then "dcaaa") is placed closer to the beginning of the linked list because the likelihood of matching the shorter byte pattern is higher.

A hash table may be populated evenly, meaning that the byte patterns map evenly among different keys. This reduces the amount of time required to match the byte patterns in the hash table. During construction of the hash table, if a mismatch string of a byte pattern indexes into a record that already has a large number of items, then the next best mismatch string of the byte pattern is used.

For example, assuming that hash table 100 in FIG. 2 has been constructed, and a new byte pattern "dcaba" needs to be indexed into the hash table. The first mismatch string in "dcaba" is "dc", but there are already two items in record 126 that correspond to the mismatch string "dc". The next mismatch string in "dcaba" is "ca", but there are also two items in record 130 that correspond to the mismatch string "ca". The third mismatch string in "dcaba" is "ab". Since there is no item in hash table 100 that correspond to mismatch string "ca", a new record may be established corresponding to a key F(Checksum("ab")). Alternatively, if a small hash table with only four records is desired, then the next mismatch string "ba" may be used to hash into a record 132 that has only one item; in this case, the mismatch value is 4.

It is useful to populate the hash table evenly in cases, for example, when the byte patterns are mostly Universal Resource Locators (URLs) and the smallest byte pattern is not an URL. This is because many URLs have the same substrings near the beginning, and will hash into the same record if the above technique is not used. Typically, once the hash table 100 is constructed, it does not change unless the set of byte patterns 124 is modified.

Hash table 100 may be used in determining whether a sequence of bytes contains the byte patterns 124. Substrings with length equal to the shortest byte pattern are taken from the sequence of bytes. For each substring, a key value is computed by applying the hash function to the checksum of the substring. If the key value matches a key in the hash table, then the checksum of the substring is compared with the checksum of the mismatch string stored in the record corresponding to the key. If a match is found between the checksum of the substring and the checksum of the mismatch string, then a longer substring with length equal to the length of the byte pattern is taken from the sequence of bytes (this will be described in more detail below). The checksum of the longer substring is compared with the checksum of the byte pattern. If there is a match, the longer substring is compared with the byte pattern to determine whether there is a match. If there are more than one byte pattern that correspond to the same key in the hash table, the comparisons of checksum of mismatch string, checksum of byte pattern, and the byte pattern are repeated for each byte pattern until a match is found.

Figure 4:
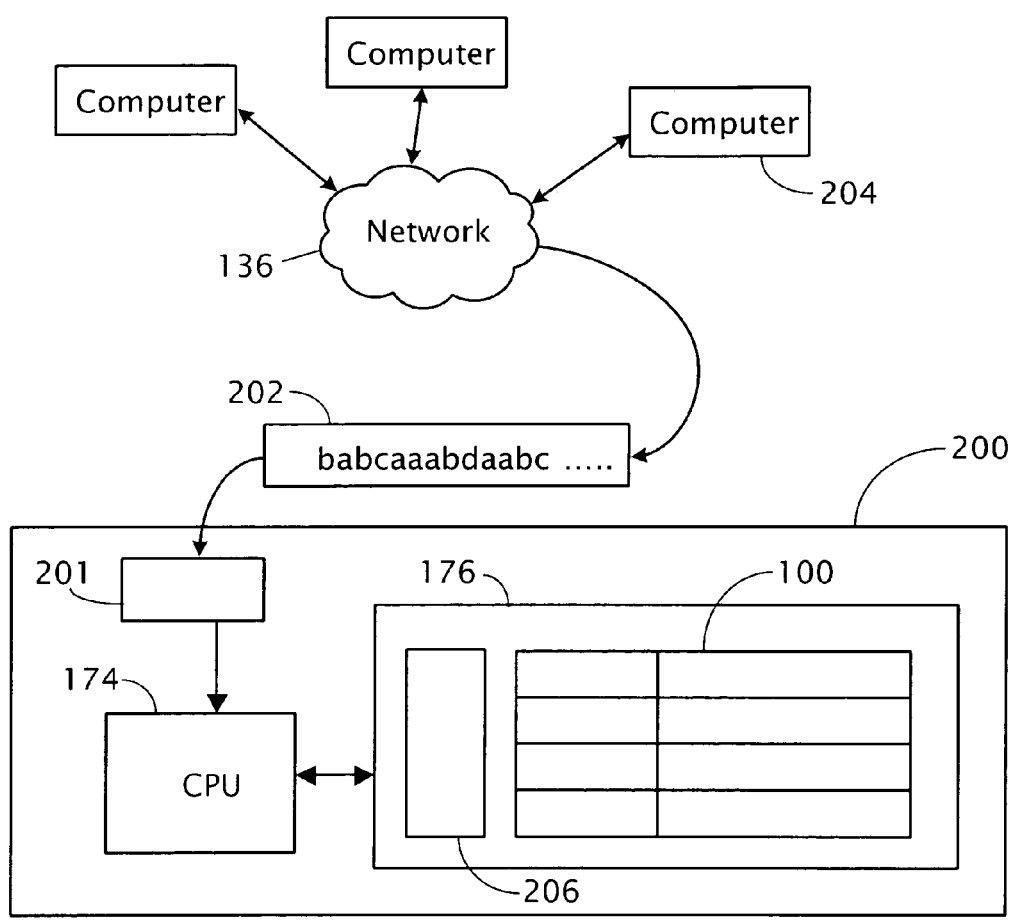
FIG. 4 shows a system block diagram.

The following is an example used to illustrate the method described above. Referring to FIG. 4, a computer 200 includes an input port 201 that receives a sequence of bytes 202, "babcaaabdaabc . . . ," from a network 136 that is connected to other computers 204. Computer 200 has a data processor 174 and a memory 176 that stores a hash table 100 and a program 206. The sequence of bytes 202 is located within a data packet that is packaged according to a predefined communication protocol. The sequence of bytes 202 is parsed from the beginning to the end by extracting substrings of length 2 (which corresponds to the length of the shortest byte pattern in hash table 100) to obtain substrings "ba," "ab," "bc," "ca," and so forth. Key values are computed from the substrings and compared against the keys in hash table 100.

To compute a key value from a substring, the hash function is applied to the checksum of the substring. The checksum of a substring may be computed efficiently from the checksum of a previous substring using a Rabin-Karp algorithm. The Rabin-Karp algorithm is useful for calculating the checksum of a second substring when the checksum of a first substring is known, where the second substring is constructed by removing the first character from the first substring and then appending a new character to the end of the first substring. (See Chapter 34 of "Introduction To Algorithms" by Cormen, Leiserson, and Rivest).

Consider the first substring "ba" in the sequence of bytes 202. The key value computed from substring "ba" is F(Checksum("ba")). Referring as well to FIG. 2, the key value matches a key 148 that corresponds to item 194 in record 132. The checksum of substring "ba" is compared against a checksum 138 of a mismatch string "ba" of a byte pattern "baab" stored in record 132. Here, the checksum of substring "ba" matches the checksum of mismatch string "ba." Next, a longer substring is extracted from the sequence of bytes 202.

The length and location of the longer substring within sequence of bytes 202 is determined from a length value 144 and a mismatch value 146 stored in item 194. The mismatch value 146 equals 1, indicating that the mismatch string "ba" is positioned at the first and second characters of byte pattern "baab." The length value 144 equals 4, indicating that 2 more characters need to be fetched from the sequence of bytes 202 and added to the substring "ba." Thus, the longer substring becomes "babc." The checksum of the longer substring "babc" is compared with the checksum of the byte pattern "baab." They do not match. Since record 132 contains only one item 194, no further comparison is necessary for the substring "ba."

Consider the second substring "ab" in the sequence of bytes 202. The key value F(Checksum("ab")) does not match any keys in hash table 100.

Consider the third substring "bc" in the sequence of bytes 202. The key value F(Checksum("bc")) does not match any keys in hash table 100.

Consider the fourth substring "ca" in the sequence of bytes 202. The key value F(Checksum("ca")) matches a key 150 that corresponds to a record 130. Record 130 contains items 178 and 180, both corresponding to key 150. Item 178 contains information relating to byte pattern "caac," including checksum 152 of a mismatch string "ca," a checksum 154 of byte pattern "caac," byte pattern "caac" 156, a length value 158, and a mismatch value 160. Item 180 contains information relating to byte pattern "caaab," including a checksum 170 of a mismatch string "ca," a checksum 172 of byte pattern "caaab," byte pattern "caaab" 168, a length value 166, and a mismatch value 164.

The checksum of substring "ca" is compared with checksum 152 of mismatch string "ca" in item 178. The checksum of substring "ca" matches checksum 152. Next, a longer substring is extracted from the sequence of bytes 202. Because mismatch value 160 equals 1, and length value 158 equals 4, two more characters need to be fetched from the sequence of bytes 202 and added to the substring "ca . . . . Thus, the longer substring becomes "caaa." The checksum of the longer substring "caaa" does not match the checksum 154 of byte pattern "caac," indicating that substring "caaa" will not match byte pattern "caac." Because item 180 is linked to item 178, further comparisons are necessary.

For item 180, mismatch value 164 equals 1, and length value 166 equals 5. This indicates that three (length value minus the length of the shortest byte pattern) more characters need to be fetched from the sequence of bytes 202 to construct a longer substring, which becomes "caaab." The checksum of the longer substring "caaab" matches checksum 172 of the byte pattern "caaab" 168. Next, the longer substring "caaab" is compared with the byte pattern "caaab" 168, and a match is found.

The comparison process is performed for subsequent substrings of length 2 in the sequence of bytes 202.

In the examples given above, the mismatch values are one. If the mismatch value is greater than one, then the longer substring is obtained by adding bytes to the beginning of the substring, where the number of bytes added is equal to the mismatch value minus one, and appending bytes to the end of the substring if necessary so that the length of the longer substring is equal to the length value. For example, if the sequence of bytes is "babcaaabd . . . ", the substring is "ca", the mismatch value is three, and the length value is six, then the longer substring is obtained by adding two bytes from the sequence (three minus one) to the beginning of the substring, and appending two bytes from the sequence to the end of the substring. Thus, the longer substring becomes "abcaaa." In the example given, the first byte of substring "ca" is at the third position of the longer substring "abcaaa," which indicates a mismatch value of three.

By using the method described above where the hash table is populated evenly, and checksum of a mismatch string (having a length equal to the shortest byte pattern) is compared prior to the comparison of the checksum of the byte pattern, time is saved in the comparison process. When the number of byte patterns is large, the efficiency achieved by the "two-tier comparison" is significant. In many instances, the checksum of a longer substring (with length equal to the byte pattern to be compared) need not be determined if the checksum of the mismatch string does not match the checksum of the substring (with length equal to the shortest byte pattern). For example, if a 32-bit checksum is used, only about one out of 4,294,967,296 random two-tiered checksum comparisons will yield a match. Only on these rare matches will a full string comparison (comparing the longer substring to the byte pattern) be required. The above method allows advanced packet classification by examination of incoming data packets at speeds of gigabits per second or higher.

Although some implementations have been described above, other embodiments are also within the scope of the following claims.

For example, the sequence of bytes 202 may be a document or a program listing residing in a memory of a computer, and the byte patterns 124 may be tokens or key words that need to be matched with the document. Different kinds of checksum functions may be used. Different kinds of hash functions may be used. The computers 200, 204 may be telecommunication routers that switch data packets sent over network 136. The data packet may have a header portion and a data portion. The router may modify the header portion based on comparisons of portions of the data portion with byte patterns in a hash table, and cause the data packet to be sent to a specified destination when there is a match. The byte pattern matching method may be used in cross-packet fragment searches. The method may be used to inspect packets sent over a communications network for viruses and worms by looking for signatures of viruses or worms in packets or in signatures distributed across related packets. The method may be used to detect network intrusions by looking for invalid user names or passwords. The method may also be used to find patterns in data packets and take certain actions with respect to related packets. The method may also be used to detect and prevent denial of service attacks by looking for particular patterns representative of such attacks.

What is claimed is:

1. A method comprising:
executing instructions stored in a storage medium to cause a machine to
apply a hash function to information associated with a substring of a sequence of bytes to generate a key value;
apply the key value to a hash table; and
compare the information associated with the substring to corresponding information associated with a substring of a byte pattern stored in the hash table that corresponds to the key value.

2. The method of claim 1 in which the information comprises a checksum.

3. The method of claim 1 in which the substring of the length of the byte pattern is equal to the length of the shortest byte pattern among the byte patterns.

4. The method of claim 1, further comprising comparing information associated with a longer substring of the sequence of bytes with corresponding information associated with the byte pattern stored in the hash table.

5. The method of claim 4 in which the length of the longer substring is equal to the length of the byte pattern.

6. The method of claim 4 in which the information comprises a checksum.

7. The method of claim 4, further comprising comparing the longer substring of the sequence with the byte pattern if a match is found between the information associated with the longer substring and information associated with the byte pattern.

8. The method of claim 4 in which the hash table comprises records, each record storing at least one of the predefined byte patterns and information associated with a substring of the predefined byte pattern.

9. The method of claim 8 in which each record stores a mismatch value representing a position of the first byte of the substring of the byte pattern within the byte pattern.

10. The method of claim 9 in which the position of the first byte of the substring of the sequence within the longer substring is equal to the mismatch value.

11. The method of claim 1 in which the hash function truncates the higher bits of the information associated with the substring and retains only a predetermined number of lower bits of the information.

12. A method of finding byte patterns in a sequence of bytes, comprising:
executing instructions stored in a storage medium to cause a machine to
generate information associated with a byte pattern;
generate information associated with a substring of a byte pattern;
generate information associated with a substring of the sequence of bytes;
generate information associated with a longer substring of the sequence of bytes;
compare the information associated with the substring of the sequence with corresponding information associated with the substring of the byte pattern; and
compare the information associated with the longer substring with corresponding information associated with the byte pattern.

13. The method of claim 12 in which the information comprises a checksum.

14. The method of claim 12 in which the lengths of the substrings are equal to the length of the shortest byte pattern among the byte patterns.

15. The method of claim 14 in which the length of the longer substring is equal to the length of the byte pattern.

16. The method of claim 15, further comprising comparing the longer substring with the byte pattern.

17. The method of claim 12 in which the position of the substring of the byte pattern within the byte pattern is the same as the position of the substring of the sequence within the longer substring.

18. The method of claim 12, further comprising applying a hash function to the information associated with the substring of the sequence to generate a first key value, applying the hash function to the information associated with the substring of the byte pattern to generate a second key value, and comparing the first key value to the second key value.

19. The method of claim 18 in which the hash function truncates the higher bits of the information and retains only a predetermined number of lower bits of the information.

20. A method, comprising:
executing instructions stored in a storage medium to cause a machine to construct a hash table having records, each record including (a) a byte pattern selected from a set of byte patterns, (b) information associated with and shorter than the byte pattern, and (c) information associated with and shorter than a substring of the byte pattern, each record corresponding to a key generated by applying a hash function to information associated with the substring of the byte pattern.

21. The method of claim 20 in which the information comprises a checksum.

22. The method of claim 20 wherein for each record containing a byte pattern other than the shortest byte pattern among the set of byte patterns, the substring of the byte pattern in the record has the same number of characters as the shortest byte pattern and is different from the shortest byte pattern.

23. The method of claim 22 wherein each record in the hash table further includes a number representing the position of the first byte of the substring within the byte pattern.

24. The method of claim 20 wherein each record includes items, each item including a unique byte pattern, information associated with and shorter than the byte pattern, and information associated with and shorter than a substring of the byte pattern, the byte patterns in the same record corresponding to the same key in the hash table.

25. The method of claim 24 in which the items are linked together as a linked list of items.

26. The method of claim 20, further comprising providing a sequence of bytes, selecting a substring from the sequence of bytes having the same length as the shortest byte pattern, generating information associated with the substring, and applying the hash function to the information associated with the substring to generate a key value.

27. The method of claim 26, further comprising comparing the key value generated from the substring of the sequence with the keys stored in the hash table.

28. The method of claim 27, further comprising comparing the information associated with the substring of the sequence with corresponding information associated with the substring of the byte pattern, the substring of the sequence and the byte pattern corresponding to the seine key value.

29. The method of claim 28, further comprising comparing information associated with a longer substring of the sequence of bytes with the information associated with the byte pattern, the longer substring having the same length as the byte pattern.

30. The method of claim 29, further comprising comparing the longer substring with the byte pattern.

31. A method, comprising:
executing instructions stored in a storage medium to cause a machine to
generate a hash table populated evenly with byte patterns, the hash table being indexed by keys, each key generated by applying a hash function to information associated with a substring of the byte pattern;
apply the hash function to information associated with a substring of a sequence of bytes to generate a key value;
apply the key value to the hash table; and
compare the information associated with the substring of the sequence of bytes to corresponding information associated with a substring of a byte pattern stored in the hash table corresponding the key value.

32. The method of claim 31 in which generating the hash table includes storing the byte patterns into the table in sequence, for each byte pattern, finding a substring of the byte pattern that is different from the substrings of byte patterns already stored in the hash table, and applying the hash function to information associated with the substring of the byte pattern to generate the key.

33. The method of claim 32, further comprising for each byte pattern, storing a length value of the byte pattern and a mismatch value of the substring of the byte pattern in the hash table.

34. An article comprising:
a storage medium having stored thereon instructions that when executed by a machine results in the following:
applying a hash function to information associated with a substring of a sequence of bytes to generate a key value;
applying the key value to a hash table; and
comparing the information associated with the substring to corresponding information associated with a substring of a byte pattern stored in the hash table that corresponds to the key value.

35. The article of claim 34 in which the hash table stores a set of byte patterns that includes the byte pattern.

36. The article of claim 35 in which the substrings have a length equal to the length of the shortest byte pattern among the set of byte patterns.

37. An article comprising:
a storage medium having stored thereon instructions that when executed by a machine results in the following:
constructing a hash table having records, each record including (a) a byte pattern selected from a set of byte patterns, (b) information associated with and shorter than the byte pattern, and (c) information associated with and shorter than a substring of the byte pattern, each record corresponding to a key generated by applying a hash function to information associated with the substring of the byte pattern.

38. The article of claim 37 in which the information comprises a checksum.

39. The article of claim 37 wherein for each record containing a byte pattern other than the shortest byte pattern among the set of byte patterns, the substring of the byte pattern in the record has the same number of bytes as the shortest byte pattern and is different from the shortest byte pattern.

40. The article of claim 39 wherein each record in the hash table further includes a number representing the position of the first byte of the substring within the byte pattern.

41. An apparatus system comprising:
a data processor; and
a memory for storing a hash table having a set of byte patterns, the memory also storing software that causes the data processor to perform the functions of
applying a hash function to information associated with a substring of a sequence of bytes to generate a key value,
applying the key value to the hash table, and
comparing the information associated with the substring to corresponding information associated with a substring of a byte pattern stored in the hash table that corresponds to the key value.

42. The system of claim 41 in which the byte patterns include patterns that indicate a higher probability that a computer virus exists in the sequence of bytes.

43. The apparatus of claim 42 in which the software further causes the data processor to perform the function of comparing a longer substring of the sequence of bytes with the byte pattern, the substring being part of the longer substring.

44. A telecommunications router, comprising:
a data processor;
an input port to receive a sequence of data packets from a network; and
a memory storing a hash table and software, the hash table being populated evenly with a set of byte patterns, the software causing the data processor to perform the functions of
applying a hash function to information associated with a substring in the data packet to generate a key value,
applying the key value to the hash table,
comparing the information associated with the substring to corresponding information associated with a substring of a byte pattern stored in the hash table that corresponds to the key value, and
comparing a longer substring in the data packet with the byte pattern.

45. The telecommunications router of claim 44, wherein the byte patterns include universal resource locators or virus patterns.

46. The telecommunications router of claim 45, wherein each data packet includes a data portion and a header port on, the substring in the data packet including a substring in the data portion of the data packet, wherein the software further causes the data processor to perform the function of modifying the header portion of the data packet based on the result of the comparison of the longer substring in the data packet with the byte pattern.

* * * * *